L. C. REED & O. P. SMITH.
CAKE HOLDER FOR COATING MACHINES.
APPLICATION FILED MAY 27, 1916.
1,226,910.
Patented May 22, 1917.
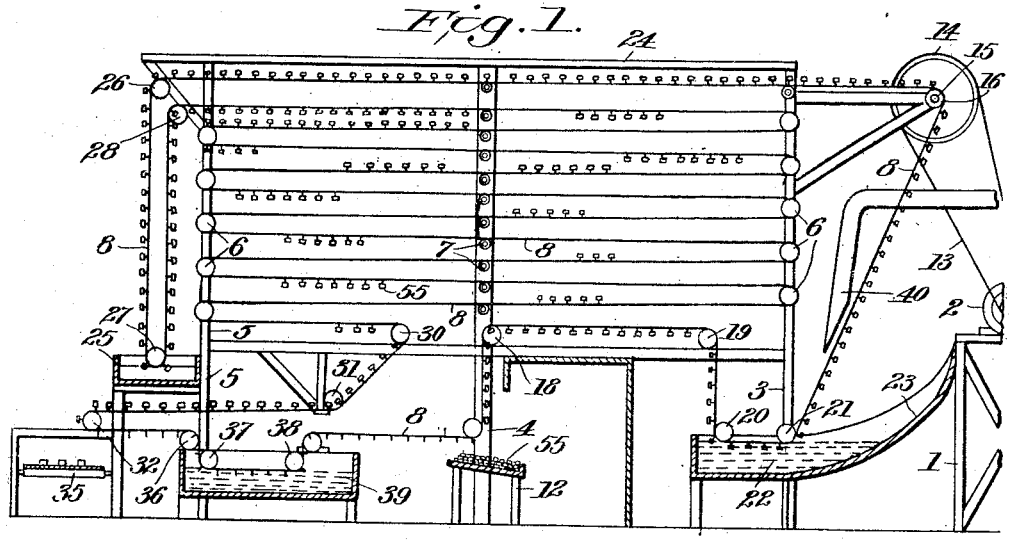
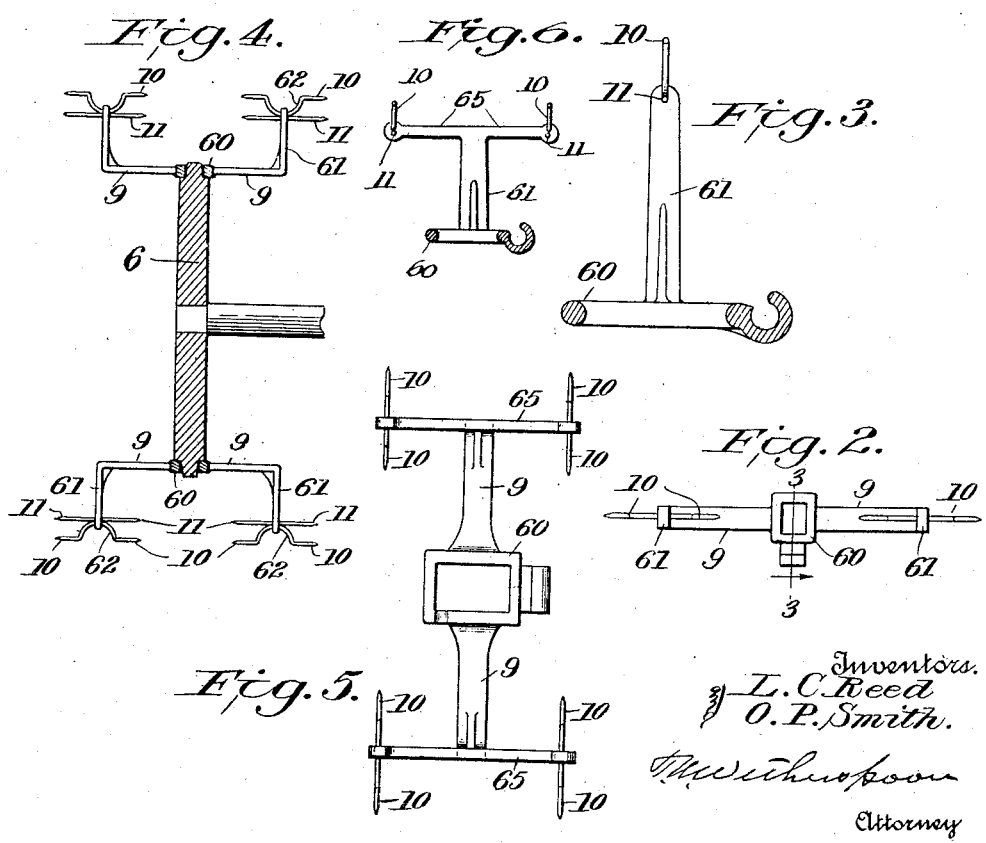

UNITED STATES PATENT OFFICE.

LYMAN C. REED AND OWEN P. SMITH, OF NEW ORLEANS, LOUISIANA.

CAKE-HOLDER FOR COATING-MACHINES.

1,226,910. Specification of Letters Patent. Patented May 22, 1917.

Application filed May 27, 1916. Serial No. 100,281.

*To all whom it may concern:*

Be it known that we, LYMAN C. REED and OWEN P. SMITH, both citizens of the United States, residing at New Orleans, in the parish of Orleans and State of Louisiana, have invented certain new and useful Improvements in Cake-Holders for Coating-Machines; and we do hereby declare the following to be a full, clear, and exact description of the invention, such as will enable others skilled in the art to which it appertains to make and use the same.

This invention relates to an apparatus for coating cakes or other articles, with marshmallow, icing or other material, and has for its object to provide an apparatus which will be simple in construction and more efficient in action than those heretofore proposed.

With these and other objects in view the invention consists in the novel details of construction and combinations of parts more fully hereinafter disclosed and particularly pointed out in the claims.

Referring to the accompanying drawings forming a part of this specification in which like numerals designate like parts in all the views—

Figure 1 is a diagrammatic side elevational view of a machine made in accordance with this invention;

Fig. 2 is a plan view of a link provided with a novel form of cake holder;

Fig. 3 is an enlarged sectional view taken on the line 3—3 of Fig. 2 and looking in the direction of the arrow;

Fig. 4 is a partially sectional view of a sprocket wheel showing a pair of links provided with the cake holders illustrated in Figs. 2 and 3; and Fig. 5 is a plan view of a link provided with a modified form of cake holder.

Fig. 6 is a sectional view similar to Fig. 3 of the modification shown in Fig. 5.

1 indicates any suitable frame or support on which the motor 2 is mounted, and 3, 4 and 5 suitable standards or other supports for the sprocket wheels 6, and guide pulleys 7 over which passes the conveyer chain 8. The conveyer chain 8 is provided in any suitable manner, as by offset arms 9, with the offset cake holders 10 and 11, preferably of the shape shown, and adapted to receive the individual cakes 55 to be iced, or coated.

12 represents a stand or receiver for holding the cakes 55, near which the operator may stand and place by hand, the cakes 55 on the holders 10 and 11 as they pass the stand 12. The conveyer 8, is suitably driven from the motor 2 by means of the belt 13, passing over the pulley 14, mounted on the shaft 15 carrying the driving sprocket 16 over which said conveyer passes as will be clear from the drawings.

The cakes 55 after leaving the stand 12, pass with the belt 8 over the guides 18 and 19 and under the guides 20 and 21 into the tank or vessel 22, containing the marshmallow or coating to be applied to the cakes 55. It will be observed that the arrangement is such that the cakes or other articles 55 to be coated pass into and out of said tank below the belt or conveyer 8, so that they are more effectually coated and so that as they ascend to the driving sprocket 16, the drip will fall free of said belt. An extension 23 of said tank is provided which extends under the path of travel of the cakes 55 to receive said drip.

After leaving the power sprocket 16 the cakes and belt pass under the top 24 of the frame work, which latter may be open or closed. If open, the subsequent travel of the belt is made sufficiently long to dry the cakes before the stand 12 is again reached, while if said framework, is closed artificial means for drying (not shown) may be employed.

Either inside or outside the standards 3, 4 and 5, but preferably outside thereof, we provide the cold icing tank 25 and pass the belt 8 over the guide 26 and under the guide 27 located in said tank so that the cakes or other articles 55 will be coated with the hardening liquid contained in said tank.

After leaving the tank 25 the cakes and belt pass over the guide 28 and back into the framework, where they pass back and forth as illustrated. If the framework be open, the number of passages backward and forward of the belt will be made sufficient to properly dry the cakes without any artificial drying means. On the other hand, if the framework be closed a drying means will be employed and in such case the number of passages backward and forward or the number of folds of the belt may be decreased.

After the cakes have been properly dried the belt 8 containing the said cakes passes over the guide 30 and out of the framework, when it may pass over another guide 31 and from said guide 31 to the guide 32 where the cakes are removed from the holders either by hand or by the action of any suitable stripping device, not shown, and deposited upon the conveyer 35 which will carry them to any convenient point for packing in boxes or for otherwise disposing of the same.

The cakes 55 being thus stripped from the belt 8, the said belt passes over the guide 36 and under the guides 37 and 38 into the tank 39 containing hot water or other cleansing fluid, whereupon the clean belt and cake holders 10 and 11 return to the stand 12 ready for the reception of fresh cakes 55, all as will be clear from Fig. 1 of the drawings.

It is an important feature of this invention that the links 60 of the belt 8 are provided with the offset arms 9 having the uprights 61 through which pass the straight pins 11 and the pins 10 having the curved portions 62, all as will be clear from the drawings.

In other words, the pins shown serve to hold the cakes in a firm manner during their travel through the apparatus, and further the plurality of points furnished by said pins enable the operator to place thereon numerous small individual articles when it is desired to coat the same.

In the modified form of the invention shown in Fig. 5, the link 60 is of the same construction as in the previous figures, as is also the arms 9. In this said modified form of cake holder however the uprights 61 are provided with the additional cross arms 65 which arms 65 at each end carry the cake holders such as 10 and 11, but of course any other suitable and desired form of cake holders may be employed.

It therefore results that the form of link shown in Fig. 5 may accommodate eight pairs of cake holders instead of four pairs as is illustrated in Figs. 2 and 4, for example.

The operation of the invention will be clear from the foregoing, but may be briefly summarized as follows:

Cakes or other articles 55 are first brought to the stand 12, where an operator places them by hand or otherwise onto the cake holders 10 and 11 whereupon the belt 8 driven by the motor 2 carries the said cakes 55 and belt over and under the guides 18, 19, 20 and 21 into the tank 22 containing the material with which it is desired to coat the cakes. After the cakes or other articles have been thus coated they are carried on the underside of the belt along an inclined path above said tank 22, and an extension 23 of said tank receives the drip from the said cakes. While the cakes are on said inclined path it is found convenient to subject them to a hot air blast which not only sets the coatings on the cakes, but also aids to remove the surplus material. Such a blast may be introduced through the pipe 40. The cakes are then carried through a framework where they may be subjected to an artificial drying operation or they may be left to dry themselves. They are also carried by the belt 8 into and out of a cold icing tank 25 where they receive icing or other hardening material, and after becoming dried in the framework they pass out of the same and are stripped in any suitable manner from their holders 10 and 11 and delivered to a conveyer 35 which latter carries the cakes to a convenient point for packing.

After the cakes have been stripped from the conveyer 8 the latter passes into a hot water tank where the icing or other coating material is dissolved from the belt or conveyer and renders the latter ready for the reception of additional cakes from the stand 12.

It will thus be seen that the operation of coating cakes or other articles by this machine obviates the wasteful and costly operations heretofore practised in that it not only prevents the waste of material, but that it saves labor and is far more cleanly and sanitary than the hand operations now in use.

It is obvious that those skilled in the art may vary the details of construction, as well as the arrangement of parts, without departing from the spirit of the invention and therefore it is not desired to be limited to the above disclosure except as may be required by the claims.

What we claim is:—

1. A cake holder for coating machines comprising a casting having a body portion adapted to form one link of a chain; a pair of integral arms symmetrically arranged one on each side of said body portion; an upright member integral with the extreme outer end of each of said arms; and a plurality of pins upon which cakes are adapted to impinge secured to said upright members, substantially as described.

2. In a cake holder for coating machines the combination of a body portion adapted to form one link of a chain and having an opening for engagement with a sprocket tooth; a pair of arms integral with said body portion; extending symmetrically from opposite sides thereof; an upright secured to the outer end of each of said arms; a cross bar attached to each of said uprights; and a plurality of pins secured to each end of said cross bars, upon which cakes are adapted to impinge, substantially as described.

In testimony whereof we affix our signatures, in presence of two witnesses.

LYMAN C. REED.
OWEN P. SMITH.

Witnesses:
 LOUISE J. GUIDRY,
 ROBERT J. NOLAN.

Copies of this patent may be obtained for five cents each, by addressing the "Commissioner of Patents. Washington, D. C."